Dec. 2, 1947.  F. D. COSGROVE  2,431,789
DOUGH CUTTING AND MOLDING DEVICE
Filed June 1, 1946
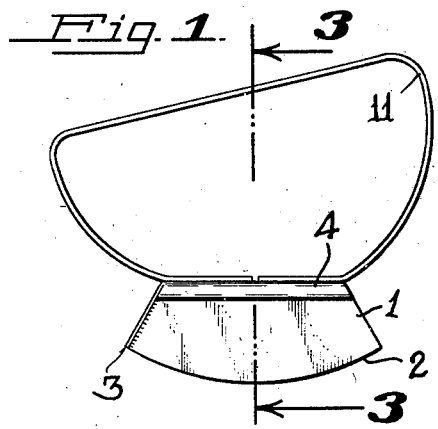
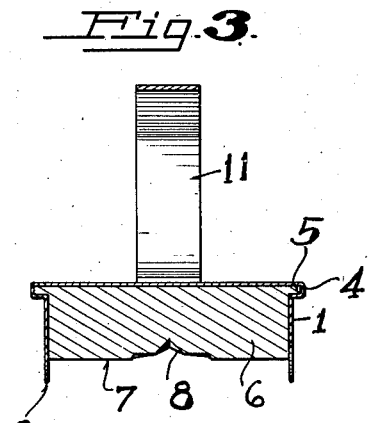
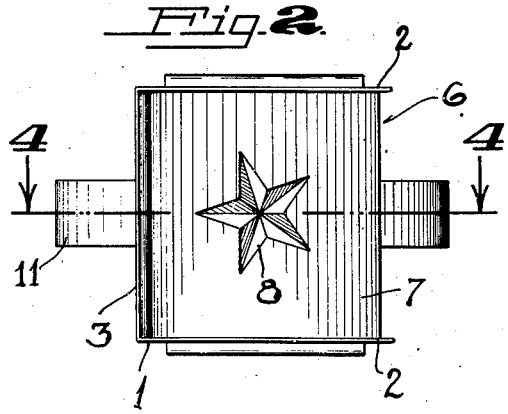
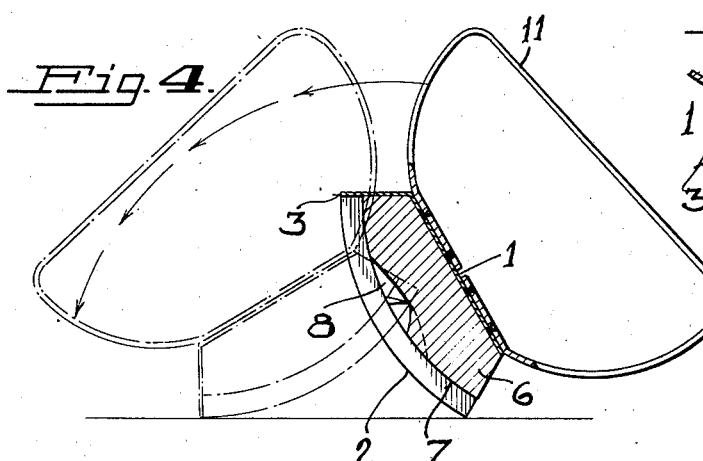
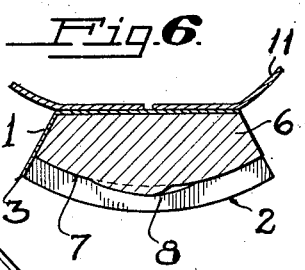
INVENTOR,
Frank Dale Cosgrove
BY
J. E. Fralucco
ATTORNEY.

Patented Dec. 2, 1947

2,431,789

UNITED STATES PATENT OFFICE 2,431,789

DOUGH CUTTING AND MOLDING DEVICE

Frank Dale Cosgrove, San Francisco, Calif.

Application June 1, 1946, Serial No. 673,817

6 Claims. (Cl. 107—47)

This invention relates to improvements in cookie making devices.

An object of my invention is to provide an improved cookie making device by which individual portions of dough may be cut from a sheet and molded into predetermined shapes by one and the same operation.

Another object of my invention is to provide an improved cookie or biscuit maker, embodying a recessed dough cutter having means for replaceably holding a mold or die member of predetermined shape in a position whereby individual portions of dough as they are cut from a larger sheet are impressed with the design carried by the mold.

Other object of my invention will be pointed out hereinafter, or will be indicated in the appended claims, or will be obvious to one skilled in the art upon an understanding of the present disclosure. For the purpose of this application I have elected to show herein certain forms and details of a cookie making device representative of my invention; it is to be understood, however, that the embodiment of my invention herein shown and described is for illustration purposes only, and that therefore it is not to be regarded as exhaustive of the variations of the invention.

In the accompanying drawings:

Fig. 1 is a side view of a device embodying the principles of my invention;

Fig. 2 is a bottom view of the device;

Fig. 3 is a sectional view taken on the line 3—3 of Fig. 1;

Fig. 4 is a sectional view taken on the line 4—4 of Fig. 2, showing diagrammatically by the broken lines the position of the device in completing a dough cutting and molding operation;

Fig. 5 is a side view of a cookie or biscuit made with the device shown in the preceding figures;

Fig. 6 is a sectional view taken through a device capable of forming a depressed figure or design on a portion of dough; and Fig. 7 is a side view of a cookie or biscuit made with the device shown in Fig. 6.

Referring to the drawings, my improved dough cutter comprises a combined die or mold holder and cutter member 1, preferably in the form of a recessed or inverted cup shaped element having arcuate cutting edges 2 at its opposite sides and a transverse cutting edge 3 at its forward end. The forward end of the cutter member 1 is closed and its opposite or rear end is open. The sides of the cutter member are bent outwardly as at 4 to provide opposed grooves or channels which are arranged to receive outwardly protruding members 5 formed on the opposite sides of a mold or die 6. The lower surface 7 of the mold 6 preferably has a curvature conforming substantially to the arcuate cutting edges 2 of the cutter member 1, and the said curved surface is spaced inwardly from the said arcuate cutting edges sufficiently to give the cookies or biscuits the desired thickness. The curved surface 7 of the mold 6 is preferably formed with a certain design or configuration 8 which is impressed on the portions of dough as they are cut from a larger sheet or section, thereby giving the cookie or biscuit a certain ornamental appearance. The design 8 may take the form of embossing as shown in Fig. 6 or it may be in the form of a depression as shown in Figs. 2, 3 and 4. The cookie or biscuit 9, (Fig. 5) formed with the mold shown in Figs. 2, 3 and 4 is embossed with the depressed design carried by the said mold, while the cookie or biscuit 10 (Fig. 7) made through the use of an embossed mold will have a depressed design formed therein.

The slidable relationship of the outwardly protruding members 5 with respect to the grooves 4 in the opposed sides of the cutter member 1 permits the removal of one mold and its replacement with another having a different design 8 thereon. Thus by providing a number of interchangeable molds having different designs thereon, cookies formed with distinctive and ornamental figures may be made with the same cutter.

A handle 11 is secured as by rivets, welding or other suitable means to the upper closed side of the cutter member 1.

The rear end of the cutter member 1 is open for two reasons one being for the purpose of permitting the convenient removal and substitution of one mold 6 for another, and the other being to avoid the formation of a partial vacuum between the mold and the dough as the cutting operation progresses, thereby avoiding the adherence of the cut portion of dough to the cutter and mold.

In operating the device the cutter member 1 is first positioned as shown by the full lines in Fig. 4 with its rear open end facing downwardly and the rear ends of the cutting edges 7 engaging with a body or sheet of dough. The cutter member, upon being rolled forwardly cuts a portion forming a cookie or biscuit from the sheet of dough and at the same time impresses thereon the design carried by the mold. The rear edge of the cookie or biscuit if still joined to the sheet of dough may be subsequently severed by a knife or by the application of the forward cutting edge 3 of the cutter member.

What I claim is:

1. In a combined dough cutter and mold, a recessed element having a bottom opening and an open rear end, arcuate cutting edges formed at the lower ends of the opposed sides of the element, a cutting edge formed on the lower end of the forward side of the element and arranged between the forward ends of the arcuate cutting edges, and a mold carried in the recessed element and arranged to engage with a sheet of dough when a cutting and molding operation is in progress.

2. In a combined dough cutter and mold, a recessed element open at its bottom and having a forward side and opposed lateral sides, a cutting edge formed at the lower end of the forward side, arcuate cutting edges formed on the lower ends of the lateral sides, and a mold carried in the recessed element and arranged to engage with a portion of a sheet of dough when a cutting and molding operation is in progress.

3. In a combined dough cutter and mold, a recessed element open at its bottom and having a forward side and opposed lateral sides, a cutting edge formed at the end of the forward side, arcuate cutting edges formed on the lower ends of the lateral sides, and a mold carried by the recessed element and having a curved lower surface arranged to engage with a portion of a sheet of dough in a cutting and molding operation.

4. In a combined dough cutter and mold, a recessed element open at its bottom and at its rear end, and having a forward end and opposed lateral sides, arcuate cutting edges formed on the lateral sides, a cutting edge formed on the forward end, the lateral sides having opposed guide members, extending toward the open end of the recessed element, a mold removably carried by the recessed element and having means at its opposite sides for engaging with the guide members, whereby the mold may be guided into the recessed element and held in an operative position therein, and a handle on the recessed member.

5. In a combined dough cutter and mold, a recessed element open at its bottom, opposed arcuate cutting edges formed on the recessed element, and a mold removably positioned in the recessed element and having a curved lower surface spaced above the arcuate cutting edges and arranged to engage with a dough portion in a cutting and molding operation.

6. In a combined dough cutter and mold, a recessed element open at its bottom, opposite arcuate cutting edges formed on the recessed element, a mold removably positioned in the recessed element and having a curved lower surface spaced above the arcuate cutting edges and arranged to engage with a dough portion in a cutting and molding operation, and engaging and guide means formed on the recessed element and the mold, whereby the mold may be guided into the recessed element and removably held therein.

FRANK DALE COSGROVE.

REFERENCES CITED

The following references are of record in the file of this patent:

UNITED STATES PATENTS

| Number | Name | Date |
| --- | --- | --- |
| 65,618 | Treadwell | June 11, 1867 |
| 414,452 | Sidway | Nov. 5, 1889 |
| 1,710,397 | Bach | Apr. 23, 1929 |
| 2,075,157 | Alberti | Mar. 30, 1937 |
| 2,192,918 | Kohler | Mar. 12, 1940 |
| 2,214,475 | Napolillo | Sept. 10, 1940 |